(12) United States Patent
Heckmann (10) Patent No.: US 10,945,318 B2
(45) Date of Patent: Mar. 9, 2021

(54) CIRCUIT ASSEMBLY FOR OPERATING A LOAD

(71) Applicant: OSRAM GmbH, Munich (DE)

(72) Inventor: Markus Heckmann, Munich (DE)

(73) Assignee: OSRAM GmbH, Munich (DE)

(*) Notice: Subject to any disclaimer, the term of this patent is extended or adjusted under 35 U.S.C. 154(b) by 0 days.

(21) Appl. No.: 16/472,212

(22) PCT Filed: Dec. 13, 2017

(86) PCT No.: PCT/EP2017/082659
§ 371 (c)(1),
(2) Date: Jun. 21, 2019

(87) PCT Pub. No.: WO2018/114533
PCT Pub. Date: Jun. 28, 2018

(65) Prior Publication Data
US 2019/0357327 A1  Nov. 21, 2019

(30) Foreign Application Priority Data

Dec. 22, 2016 (DE) ...................... 10 2016 225 978.4

(51) Int. Cl.
*H05B 45/37* (2020.01)
*H02M 3/158* (2006.01)

(52) U.S. Cl.
CPC .......... *H05B 45/37* (2020.01); *H02M 3/1588* (2013.01)

(58) Field of Classification Search
None
See application file for complete search history.

(56) References Cited

U.S. PATENT DOCUMENTS

| | | |
|---|---|---|
| 2006/0024517 A1 | 2/2006 | Doan et al. |
| 2006/0245174 A1 | 11/2006 | Ashdown et al. |
| 2007/0210772 A1* | 9/2007 | Sawtell ............... H02M 3/156 323/282 |
| 2015/0327340 A1 | 11/2015 | Siessegger et al. |
| 2016/0365847 A1 | 12/2016 | Tomasovics et al. |

FOREIGN PATENT DOCUMENTS

| | | |
|---|---|---|
| DE | 102016110671 A1 | 12/2016 |
| WO | 2015166559 A1 | 11/2015 |
| WO | 2016012522 A1 | 1/2016 |

OTHER PUBLICATIONS

International Search report based on Application PCT/EP2017/082659 (3 pages) dated Mar. 8, 2018 (for reference purpose only).

(Continued)

*Primary Examiner* — Lynda Jasmin
*Assistant Examiner* — Laura Yesildag
(74) *Attorney, Agent, or Firm* — Viering, Jentschura & Partner MBB (57) ABSTRACT

A circuit assembly for operating a load may include an input for inputting an input voltage and/or current. The circuit assembly may further include an output for outputting an output voltage and/or current. The circuit assembly may further include an at least partially digital switching regulator with a feedback loop. A loop gain of the feedback loop may be frequency-dependent where the frequency ranges from 3 Hz to 20 Hz.

10 Claims, 8 Drawing Sheets

(56) References Cited

OTHER PUBLICATIONS

German Search report based on Application 10 2016 225 978.4 (6 pages) dated Jul. 28, 2017 (for reference purpose only).
Jatskevich et al.: "An Investigation of Flicker Reduction Using an Adaptive Var Compensator", In: ECE Technical Reports, Jan. 3, 1997; p. 29-32.
European Office Action for the corresponding EP application No. 17 822 620.5, dated Aug. 10, 2020, 5 pages (for informational purposes only).

* cited by examiner

CIRCUIT ASSEMBLY FOR OPERATING A LOAD

CROSS-REFERENCE TO RELATED APPLICATION

The present application is a national stage entry according to 35 U.S.C. § 371 of PCT application No.: PCT/EP2017/082659 filed on Dec. 13, 2017, which claims priority from German Patent Application Serial No.: 10 2016 225 978.4, which was filed on Dec. 22, 2016; all of which are incorporated herein by reference in their entirety and for all purposes.

TECHNICAL FIELD

The disclosure relates to a circuit assembly for operating a load with a partially digital control loop circuit with improved stability to quantization oscillations.

BACKGROUND

The disclosure is based on a circuit assembly for operating a load according to the genre of the main claim.

Figure 1:
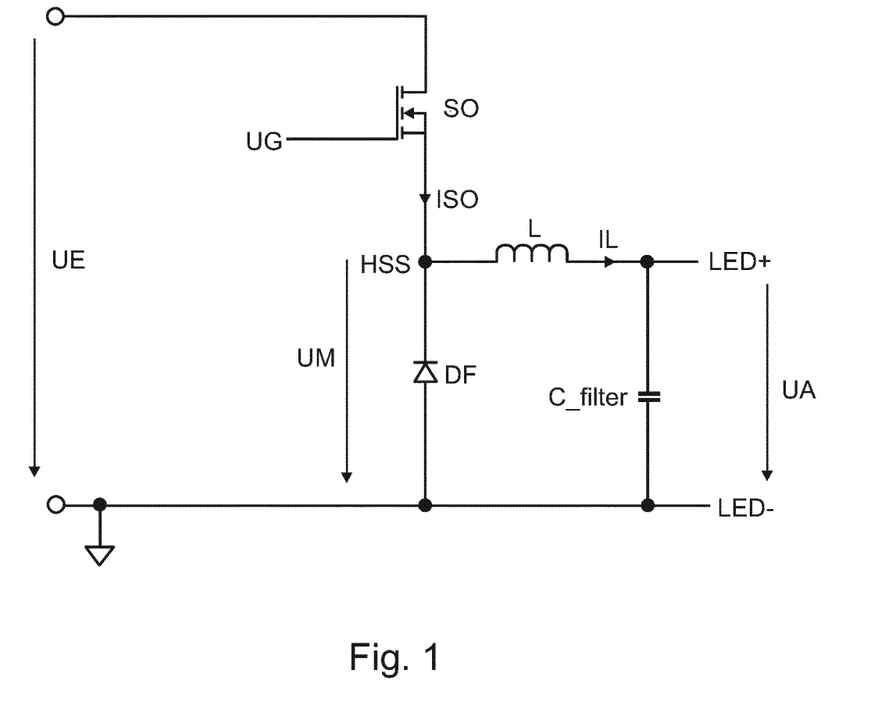
FIG. 1 a schematic illustration of a known buck converter according to the prior art.

FIG. 1 shows a known step-down or buck converter with the equally well-known main components. A switch SO is connected in series with a freewheeling diode DF. The junction of the cathode of the freewheeling diode DF and the switch TO is connected to a choke L. The other terminal of the choke L is connected to a filter capacitor C_filter. The other end of the filter capacitor C_filter and the anode of the diode DF are connected to ground.

The other terminal of the switch SO together with the ground is the input of the buck converter. The output of the buck converter is in parallel with the filter capacitor C_filter.

Such buck converters are widespread and operate satisfactorily. However, at low output voltages operation with zero voltage switching is no longer possible. As a result, the switch becomes very hot and must be dimensioned larger as a result.

Figure 2:
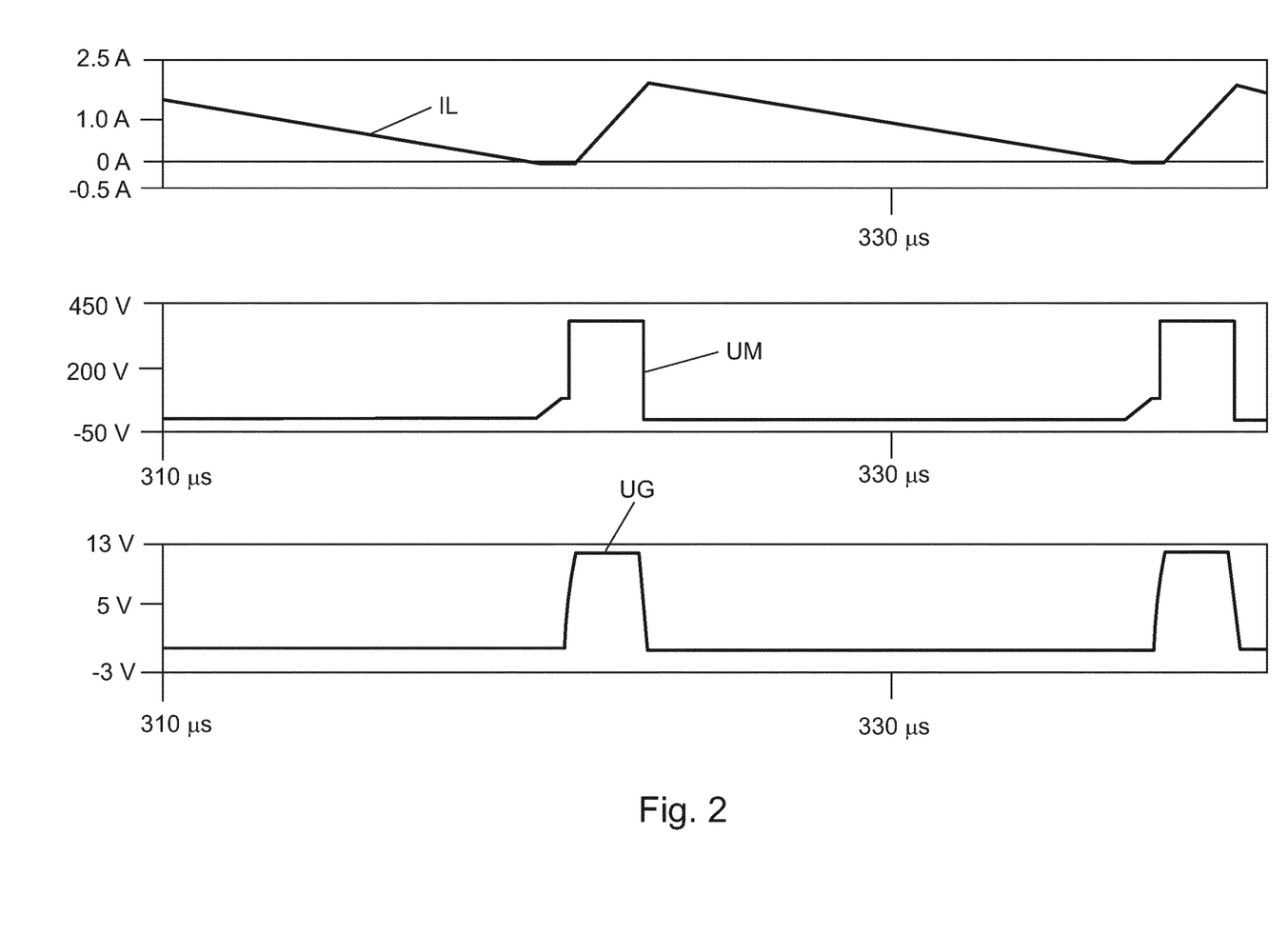
FIG. 2 a timing diagram of the known buck converter

FIG. 2 shows some relevant signals of the known buck converter. The current IL is the current through the inductance L. It can be easily seen that in operation the converter here is operating in the critical conduction mode, also designated as the "transition mode". When the switch is on the current increases sharply due to the magnetizing of the choke, until at a certain maximum current it is switched off. The converter choke then becomes demagnetized again, which at low output voltage or low output current takes much longer than the magnetization phase. The current in this case flows through the freewheeling diode DF. It is easily seen that the transistor is turned on again as soon as the current through the freewheeling diode has decayed to the value 0 A. Thus, in operation the converter operates in the critical conduction mode. At input voltages of over 200V this operating mode is a favorable compromise between good efficiency, good power density and costs. However, for smaller output voltages or output currents no low-loss switching is no longer possible, as is clear from the temporal waveform of UM in FIG. 2. The natural polarity reversal process of the voltage UM at the half-bridge midpoint reaches only a fraction of the input voltage. The achievable value is twice the output voltage, or taking into account the real recovered charge of the diode, even slightly more.

The remaining voltage swing must be achieved by lossy hard switching of the MOS-FET. This can be seen at the first flat increase in the voltage UM at the half-bridge midpoint. The voltage UG by comparison shows the gate-source voltage of the transistor SO. By the time that UM reaches the maximum of its natural polarity reversal process, SO is turned on.

Another disadvantage of hard switching operations is the poor electromagnetic compatibility at higher frequencies above 10 MHz and a limited potential for miniaturization due to the above disadvantages.

If this converter is then digitally controlled, as is now common practice, then a further problem arises: with digital control via a microcontroller, a digital control path is implemented.

Such a digital control path has a number of problems. The main problems are quantization errors both in the A/D conversion, as well as temporal quantization errors due to the propagation times in the microcontroller, which depend on the clock frequency and several other features peculiar to a microcontroller.

Because of the quantization steps, the output signal cannot assume every possible value. Typically, the entire control loop will oscillate around the actual target value (quantization oscillation), even if the control loop is stable in the sense of the Nyquist criterion.

Due to the quantization oscillation, current fluctuations can develop, which appear as unwanted flickering in the light of the LEDs.

Due to the quantization steps, only discrete time points can be implemented at which the transistor of the converter can be switched. If the switching times are examined over many cycles, these are not constant, but jump around the desirable but unattainable target value. In the case of multiple asynchronous quantization mechanisms temporal clusterings of the quantization steps can occur. In unfavorable conditions, these clusterings can lead to a frequency spectrum and an amplitude of oscillation which are perceptible to the human eye.

This is aggravated by the steep gradient of the actual I-V characteristic of modern LEDs. Even minor changes to the converter output voltage or switching times cause significant changes in the LED current. The fact that in efficient converters the RDSon of the transformer transistor and the ohmic resistance of the converter inductor L are also very low, exacerbates the problem even further.

If the supply voltage of the converter then remains very stable, a fine and accurate control of the LED current is very difficult.

The problem is exacerbated the more asynchronous digital stages there are in the control loop.

The digital control path results in additional propagation times and the above-mentioned quantization errors, which arise mainly as a result of microcontroller-specific properties. In an A/D conversion, a quantization error is produced with regard to the control parameters, the size of which depends on the resources of the microcontroller.

The digital detection of threshold values is also a further source of error, since the detection time is fitted into a quantized timing raster.

Further quantization errors arise from internal routing units of the microcontroller and from digital timers.

All these boundary conditions mean that a precise regulation of the current is not a simple matter and will require very expensive and high-grade hardware to adequately prevent the visible oscillations in the current referred to above.

SUMMARY

An improved circuit assembly may ensure a more precise control of the output current without the quantization errors having an effect on the light visible to the human eye.

A circuit assembly for operating a load may have an input for inputting an input voltage, an output for outputting an output voltage, a switching regulator with a switching transistor, an inductance and a current valve, wherein the current valve is actively controlled and the switching regulator operates in a forced continuous mode, wherein the circuit assembly has a feedback loop, the loop gain of which is chosen dependent on the frequency spectrum.

The fact that the loop gain is frequency-dependent means that for a load which quickly follows the current and generates light in the visible range, it can be chosen with a high value and in the non-observable range with a lower value, to shift the quantization errors as far as possible into the frequency range no longer observable to the human eye. An additional benefit obtained is an increase in the effective resolution, because the quantization oscillation over the frequency distribution of the chosen steps can also represent intermediate values on average.

An example of a load that quickly follows the current and emits visible light is one or more LEDs.

Particularly, the loop gain of the feedback loop in the frequency range below 100 Hz is greater than the loop gain in the frequency range above 100 Hz. As a result, the effect of the quantization errors is particularly noticeable in the frequency range above 100 Hz, which is not visible to the human eye.

In a non-limiting embodiment the loop gain is 55 dB at 10 Hz and 35 dB at 100 Hz. With these gain values a control loop for regulating the output current of the circuit assembly can be advantageously constructed, which can regulate the output current so precisely that no visible perturbations appear in the light emitted by the load.

In order to accomplish this, in an advantageous embodiment the feedback loop includes an integrator whose gain is frequency-dependent.

This measure ensures the above-mentioned property in a reliable and relatively inexpensive variant.

In a further advantageous embodiment the feedback loop includes a microcontroller, which implements a digital controller. In a particularly advantageous way, this measure enables many features to be implemented that would be difficult and expensive to implement in analog technology.

The regulation is particularly advantageously a two-point control system with a lower threshold and an upper threshold. Such a control system is advantageously particularly inexpensive to manufacture and is exceedingly well suited to work with a clocked converter, in which a converter transistor must be switched on and off.

Particularly, the lower threshold, which describes the switch-off time of the current valve in the forced continuous mode, is defined at a negative choke current.

A negative choke current here refers to the choke current which takes place after the demagnetization of the choke and the current zero crossing while the current valve (SU) remains switched on.

Due to this special continuous mode, also known as the FCCM (forced continuous conduction mode), a particularly low-loss, zero-voltage switching (ZVS) can be implemented.

In a non-limiting embodiment the lower threshold for smaller output voltages is less than it is for larger output voltages. This ensures a zero-voltage switching for all possible output voltages.

In order to further refine the control system, the lower threshold can also be dependent on the output current of the circuit assembly. Furthermore, the output power and the input voltage of the circuit assembly can be used to define the lower threshold.

In the case of a digital control system, it can be simpler if at lower output voltages an additional delay time dependent on the output voltage is inserted by the control element, e.g. by the microcontroller, after reaching the lower threshold, in order to delay the switch-off time of the current valve. With this measure, the lower comparator threshold can even remain the same, which in the case of analog querying of the lower threshold, e.g. via a comparator, is advantageously much simpler and more cost-effective to implement.

In another non-limiting embodiment the upper threshold, which describes the switch-off time of the switching transistor, is defined by the output current of the circuit assembly to be regulated and the switch-off time of the current valve.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the illumination apparatus. In the following description, various aspects are described with reference to the following drawings, in which.

DETAILED DESCRIPTION

Figure 3:
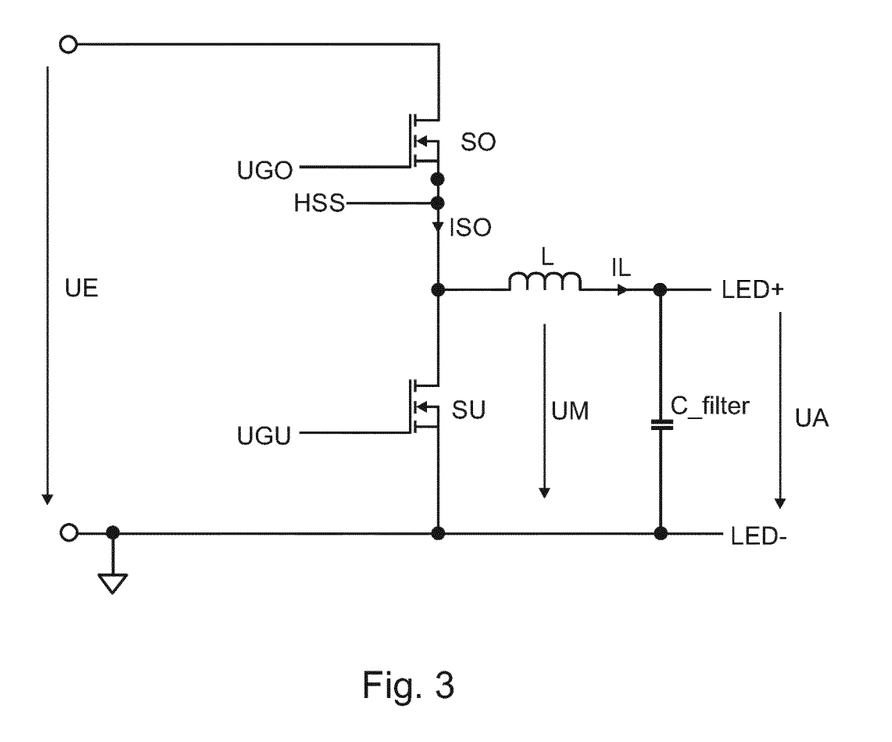
FIG. 3 a schematic circuit diagram of a known synchronous rectifying buck converter FIG. 4 a timing diagram of the known synchronous rectifying buck converter FIG. 5 a first analog embodiment of a synchronous rectifying buck converter FIG. 6 a second digital embodiment of the synchronous rectifying buck converter FIG. 7 a third digital embodiment of the synchronous rectifying buck converter FIG. 8 a diagram which shows the loop gain plotted against frequency

FIG. 3 shows a schematic circuit diagram of a known synchronous rectifying buck converter. The main difference with respect to the topology described in FIG. 1 is the replacement of the converter diode DF by a lower transistor SU. This gives rise to a half-bridge structure, wherein the half-bridge is connected in parallel with the input of the converter. The positive input is at a DC potential of approximately 400V, the negative input is a reference potential. The converter choke L is connected to the half-bridge mid-point HSS, the other terminal of the converter choke L together with the reference potential forms the output LED+/LED− of the converter. A filter capacitor C_filter is connected in parallel with the LED+/LED− output of the converter.

Figure 4:
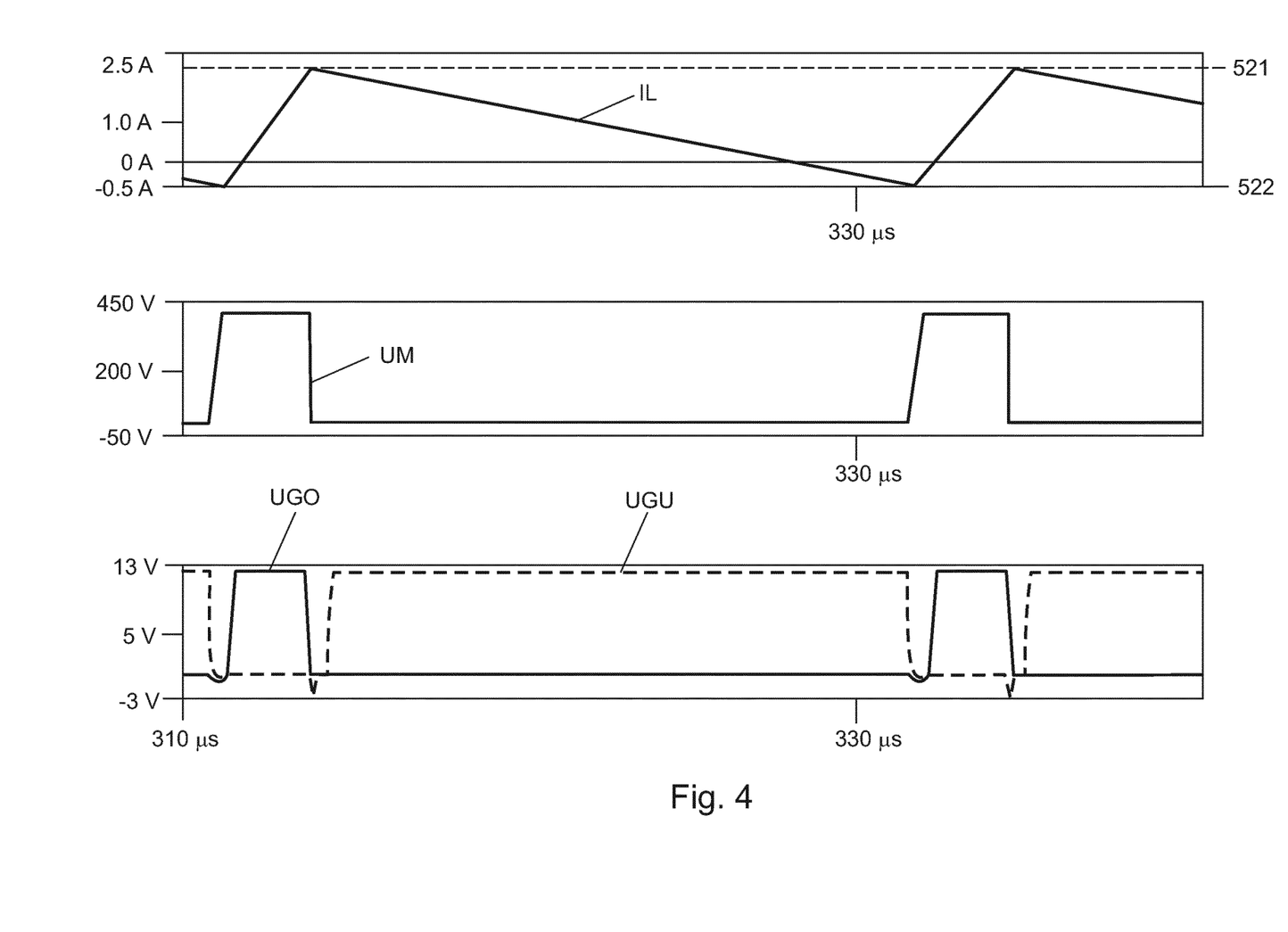

The two half-bridge transistors SO and SU are now driven as shown in FIG. 4. FIG. 4 shows a timing diagram of the known synchronous rectifying buck converter. The voltage UGO is the voltage at the gate of the upper transistor SO, the voltage UGU the voltage at the gate of the lower transistor SU.

On the basis of the current IL through the choke L the difference compared to the known converters is easily identified. Here, the converter in operation is not operating in the critical conduction mode, but in the continuous mode and specifically, in such a way that the transistor is only switched off when the choke current is negative, in the present embodiment at approximately −0.5 A. As is clear from the diagram, when the converter transistor SO is switched on (signal UGO is high) the choke L is magnetized, and after switching off the converter transistor SO it is de-magnetized again. During this time a positive choke current IL always flows. After the demagnetization time the current goes to zero and then negative. This happens because the lower transistor remains switched on and thus a current path continues to be present. The current through the converter choke IL in this period is thus negative until the lower transistor SU is switched off. This has the consequence that the transistor can be switched with low switching losses, even at very low output voltages, as shown in FIG. 4.

From the timing diagram it is also easy to identify that between switching off the upper transistor SO and switching on the lower transistor SU a dead time is provided, during which the polarity reversal of the half-bridge takes place. The voltage across the respective switch at the moment of the switching-on or -off operation is practically zero (Zero Voltage Switching-ZVS). This dead time is of course also provided between turning off the lower transistor and turning on the upper transistor.

Figure 5:
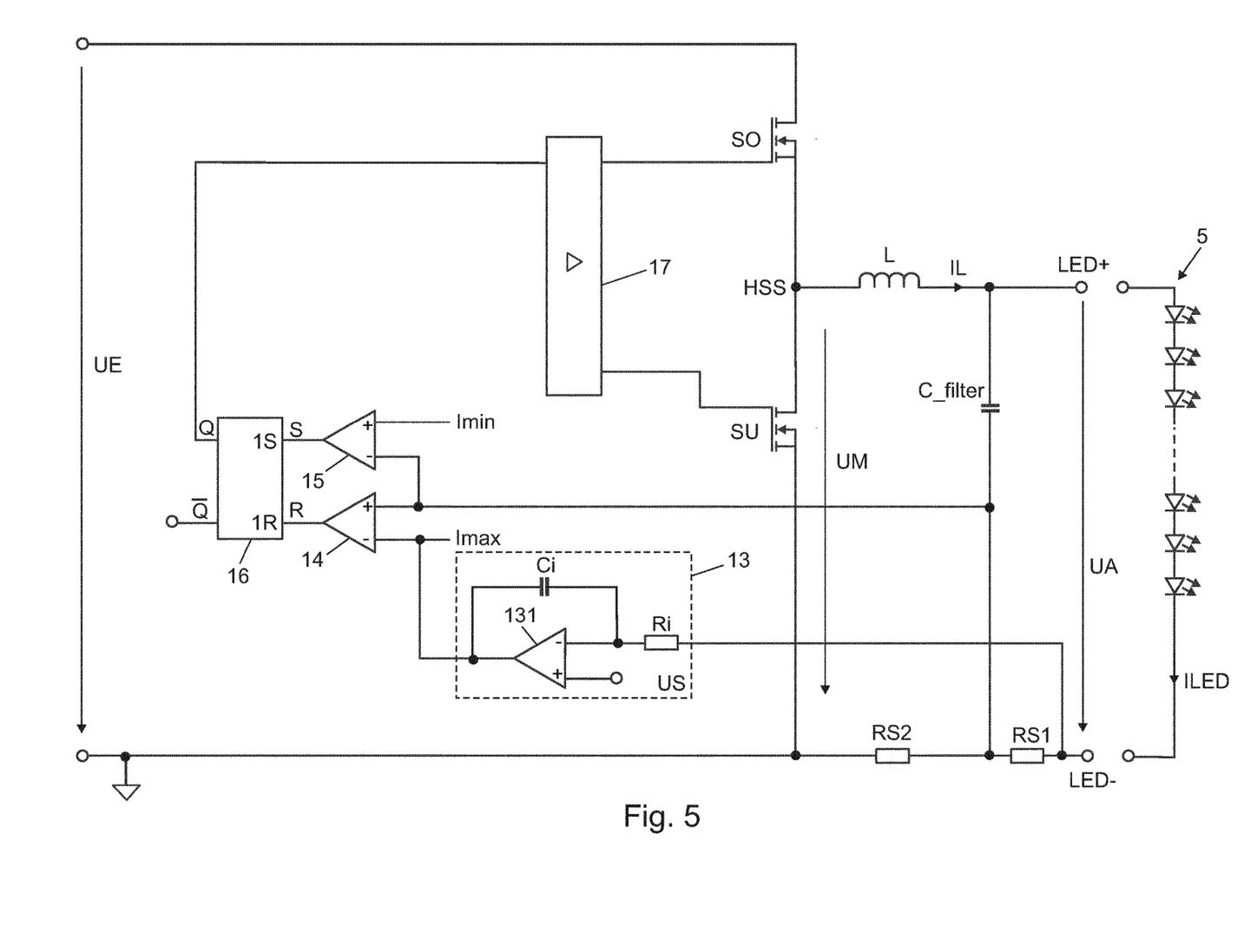

FIG. 5 now shows a schematic diagram of a first embodiment, without temporal quantization, of the synchronous rectifying buck converter. In principle, the converter is operated with a two-point controller, wherein the turn-off time of the lower transistor SU is specified at approximately −0.5 A choke current, and the turn-off time of the upper transistor is variable for the purposes of current regulation of the connected LEDs. The turn-off time of the upper switch determines the maximum current through the switch and the converter choke. This is dimensioned in such a way that the average current through the choke is the same as the predefined current through the LEDs. The filter capacitor at the output theoretically falsifies the correlation between the current IL through the converter choke and the output current ILED, but in the steady-state condition this error is zero, because the capacitor does not provide a DC current path.

The current ILED through the LEDs 5 is detected with two sensing resistors RS1 and RS2. The voltage across both sensing resistors RS1 and RS2 is fed to an integrator 13, to which a voltage which is proportional to a predefined light-emitting diode current ILED is fed as input. This measurement voltage corresponding to the light-emitting diode current is then averaged in the integrator 13 and fed to the negative input of a first comparator 14 as a threshold for the maximum current through the transformer choke L. The positive input is supplied with the voltage dropped across the resistance RS2 which reflects the present value of the current through the LEDs 5. The output of the first comparator 14 is fed to a reset input R of a flip-flop 16. The voltage dropped across the resistance RS2 is also fed to a negative input of a second comparator 15. The positive input of the second comparator 15 is connected to a reference voltage, which is a measure of the turn-off threshold of the lower transistor SU. This voltage can be used to adjust the deactivation of the lower transistor SU at a particular negative choke current, as described above.

The half-bridge driver circuit 17 ensures that a certain dead time is maintained between the switching operations of the upper and lower transistor, so that no short-circuit current can be produced through the half-bridge, and the complete polarity reversal of the half-bridge is also carried out before the respective transistor is turned on again.

The logic in the half-bridge driver is as follows:

If the output signal Q of the flip-flop 16 flips to high, the lower transistor SU is switched off as soon as possible. This is followed by the dead time, during which both transistors are turned off. After the dead time has elapsed the upper transistor SO is switched on. If the output signal Q of the flip-flop flips back to low, the upper transistor SO is switched off as soon as possible. This is followed by the dead time again, during which both transistors are turned off. After the dead time has elapsed the lower transistor SU is switched on.

The function of the overall circuit is as follows: due to the averaging of the current in the integrator 13 a desired mean current value is created, which is adjusted via the voltage US. This mean current value is fed to the comparator 14 as a threshold value and compared with the present current value. This leads to a turn-off threshold of the upper transistor, which corresponds to the desired mean current value through the LEDs. If the present current value exceeds the predefined setpoint, the output of the first comparator 14 goes high and resets the flip-flop 16. The upper transistor is then switched off. The current now flows from the converter choke L through the LEDs 5 via the parasitic output capacitance of the half-bridge back to the converter inductor L and the half-bridge voltage UM swings to zero. Then the current commutates onto the freewheeling diode of the lower transistor SU. Shortly thereafter, the dead time has elapsed and the lower transistor SU is switched on.

The present current value is input into the negative input of the second comparator 15. The minimum current value Imin is input into the positive input as a voltage at which the lower transistor should turn off again. If the minimum current value is reached, the output of the second comparator 15 switches to high and sets the flip-flop again. This switches the lower transistor off. The current now flows from the choke into the parasitic output capacitance of the half-bridge and the voltage UM swings high up to the value of the input voltage UE. Then the current commutates onto the freewheeling diode of the upper transistor SO. Shortly thereafter, the dead time has elapsed and the upper transistor SO is switched on. As soon as the current through the converter choke L has reached the peak value the upper transistor SO switches off again and the cycle repeats itself.

Figure 6:
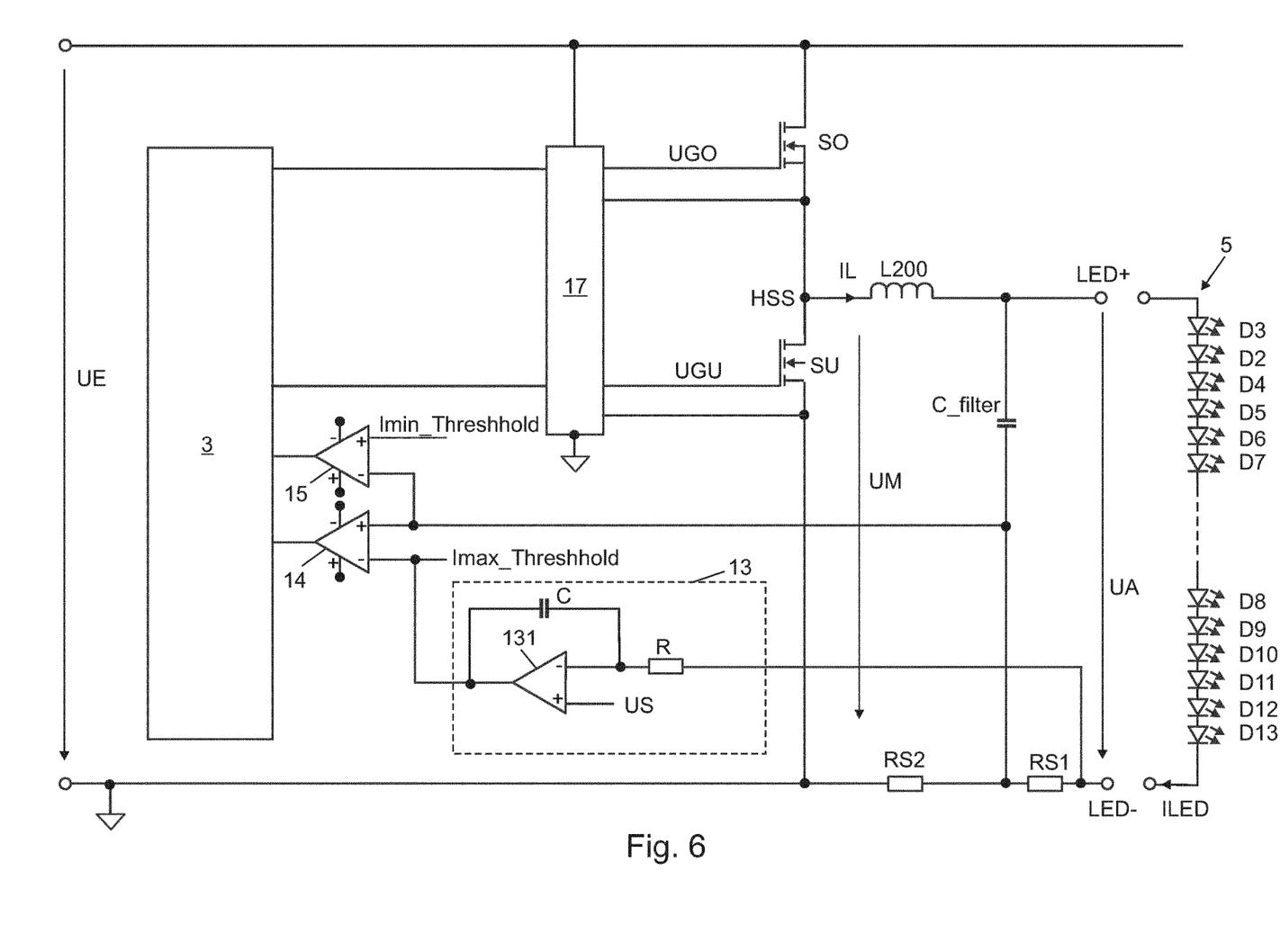

FIG. 6 shows a second embodiment of the synchronous rectifying buck converter. The second embodiment of the converter is a digital embodiment with a microcontroller.

The second embodiment has a similar circuit design to the first embodiment, so that only the differences relative to the first embodiment are described in the following.

In the second embodiment, the flip-flop 16 is replaced by a microcontroller 3, which has implemented further control mechanisms. The on and off thresholds are signaled to the microcontroller as in the analog version by the first and second comparators 14 and 15, but the microcontroller does not respond as a flip-flop but implements a digital control loop instead.

In order not to encounter the above-mentioned problems with the digital control path, in the second embodiment the integrator 13 is parameterized such that the assembly has a high loop gain in the frequency range observable to human beings, while this should be lower in the non-observable range, in order to enable/facilitate the quantization oscillation selectively in the non-observable range.

The control error is derived from the loop gain, at high loop gain the control error is small, at low loop gain the control error is large.

Because the errors in a control path are inherent, figuratively speaking the control error must be shifted from the range easily perceptible to the human eye into the range no longer perceptible to the human eye, in order to solve the problem.

To this end, the loop gain is set in such a way that it is high in the range easily perceptible to the human eye and relatively low in the range not so well perceived by the human eye.

For this purpose, in the present embodiment the integrator 13 is constructed in such a way that its gain is frequency-dependent. The operational amplifier 131 is thus connected to a resistor Ri and a capacitor Ci. Since the impedance of the capacitor is frequency-dependent, overall this produces a frequency-dependent gain of the integrator 13. This measure results in quantization errors in the microcontroller being mainly shifted into the frequency range which cannot be perceived by the human eye, and the emitted light no longer exhibits any noticeable fluctuations.

The integrator 13 is now parameterized such that the loop gain at 10 Hz is approx. 55 dB and the loop gain at 100 Hz is approximately 35 dB. Therefore, the errors are shifted to higher frequencies above 100 Hz and any flicker is no longer perceptible to the human eye.

The limitation of the gain at low frequencies results from the non-infinite open-loop gain.

The integrator shown is a very simple form in order to achieve a suitable frequency-dependent first-order loop gain. If necessary, further improvements can be implemented with higher-order transfer functions. A transfer function may achieve a frequency-dependent loop gain oriented towards human perception. In particular in the frequency range between 3 Hz and 20 Hz, this loop gain is designed to be as large as possible. In addition, based on experience, at 100 Hz/120 Hz (twice the frequency of an upstream supply network) a sufficiently high loop gain is also desirable in order to sufficiently suppress the circuit-specific interference of the network frequency and integer harmonics.

At the output of the integrator 13 a voltage is available, in principle, which allows the average control error of the control path to fall to a minimum, and this is used to determine the turn-off time of the upper switch SO.

The turn-off time of the lower switch depends on the voltage of the LED chain 5 and is selected the later, the lower is the voltage of the LED chain 5, in order to enable a switching with minimum losses.

As a rule of thumb therefore, the smaller the voltage of the LED chain 5, the greater the magnitude of the negative threshold of the current through the converter choke L. At higher output voltages the size of this threshold can be reduced, theoretically to a threshold of 0, which in turn would correspond to operation in the critical conduction mode (transition mode).

These different output voltage-dependent switching times are stored in the microcontroller. This can be in the form of a table, an action instruction in the form of a formula, or similar. Alternatively, the threshold of the comparator 15 can of course also be changed depending on the output voltage. In addition, threshold and delay times can be changed depending on any desired parameters. The microcontroller then controls the half-bridge driver 17 accordingly, in order to achieve a maximally low-loss operation of the converter with simultaneous maximum precision of the output current.

The third embodiment is a cost-optimized alternative design of the buck converter. As is apparent from FIG. 7, additional analog hardware has been saved compared to the microcontroller. Only one current sensing resistor RS is now provided, whose voltage is input into a comparator 18. The output of the comparator is input into the microcontroller, to signal that a predefined current threshold has been reached. In addition, the current sensing signal is fed to an analog-to-digital converter.

Figure 7:
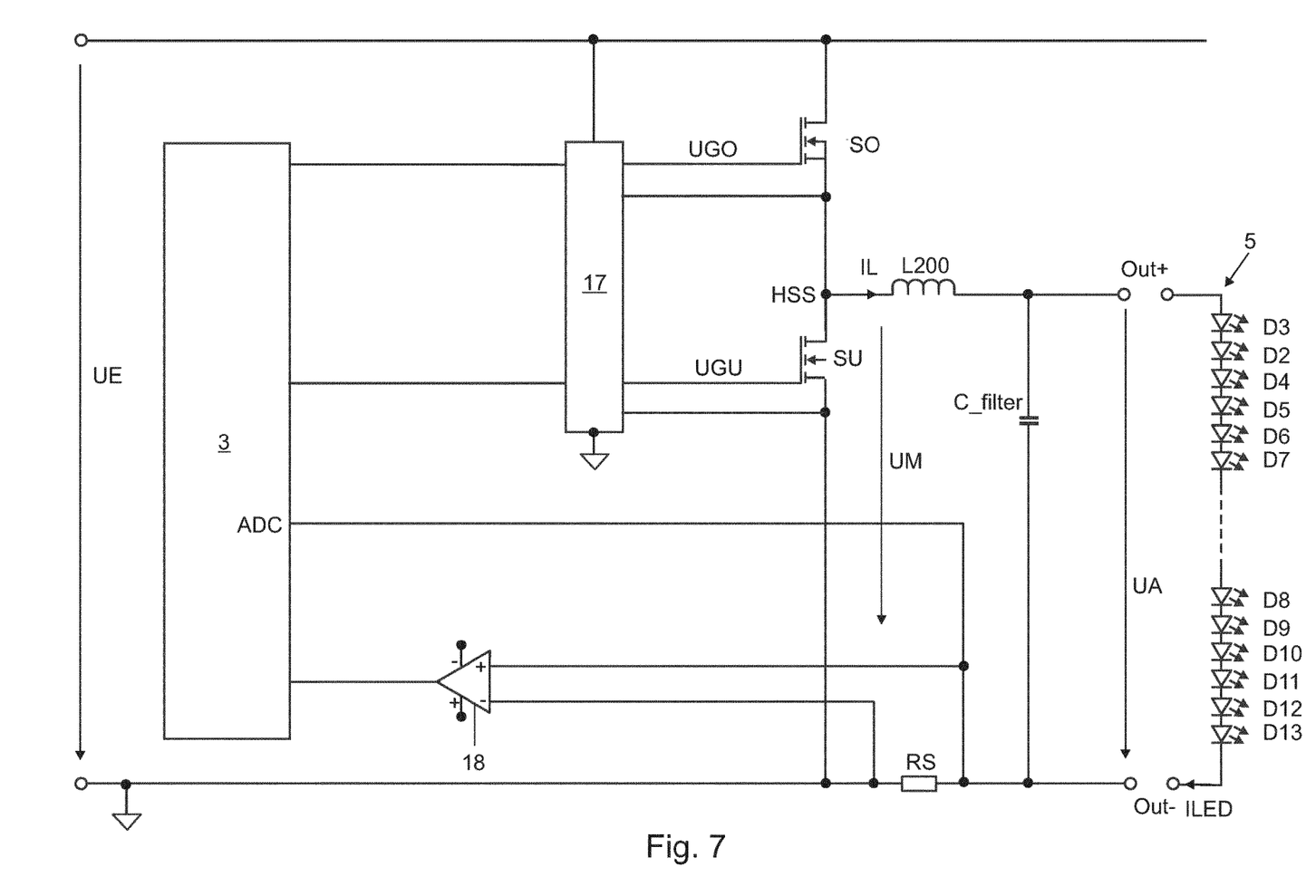

The comparator 18 as well as the analog-to-digital converter can be either implemented as separate components or integrated in the microcontroller.

In this example, the required frequency-dependent loop gain and the comparison with the setpoint are implemented in the software/firmware of the microcontroller, in order to implement a regulation of the output current.

Instead of two comparators, a comparator with positive feedback, such as a Schmitt trigger, can also be used. The advantage in terms of component savings is offset by the disadvantage that in current embodiments of a Schmitt trigger, the two switching thresholds cannot be varied completely independently of each other.

Figure 8:
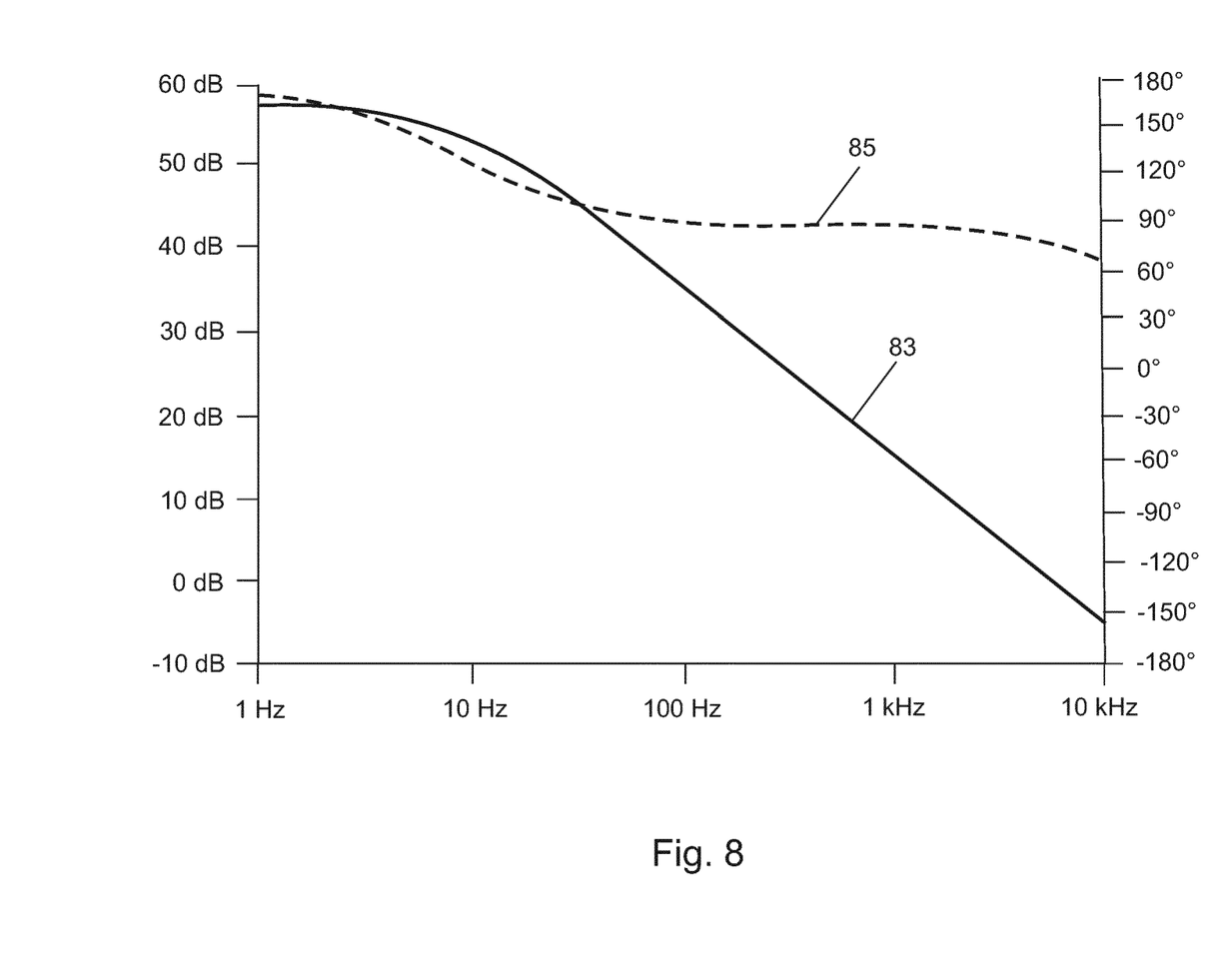

FIG. 8 shows a diagram which shows the loop gain 83 of the assembly plotted against frequency. It can clearly be seen that the loop gain at low frequencies is large and decreases towards higher frequencies. In curve 85 the phase response of the assembly is also plotted against the frequency.

The circuit assembly can not only be used in a buck converter in the forced continuous conduction mode. The quantization problem also occurs in other converter types and can be mitigated there with the same criteria for the loop gain.

Particularly important in this context are digital or partially digital implementations of the following converter types:

step-up converters (boost), flyback converters, SEPIC converters, Cuk converters, LLC, LCC and DARC converters.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes that come within the meaning and range of equivalency of the claims are therefore intended to be embraced.

LIST OF REFERENCE NUMERALS 1 circuit assembly
3 microcontroller
5 LEDs
13 integrator
14 first comparator
15 second comparator
16 flip-flop
17 half-bridge driver
18 comparator
SO upper switching transistor
SU lower switching transistor
L converter choke
C_filter filter capacitor
RS shunt
RS1 shunt
RS2 shunt

The invention claimed is:
1. A circuit assembly for operating a load, comprising:
an input for inputting an input voltage and/or current;
an output for outputting an output voltage and/or current; and
a switching regulator with a feedback loop, wherein the feedback loop includes: a micro-controller; and
an integrator having a frequency-dependent gain;
    wherein a loop gain of the feedback loop is frequency-dependent; and
    wherein the loop gain of the feedback loop in the frequency range below 100 Hz is greater than the loop gain in the frequency range above 100 Hz;
    wherein the integrator comprises an operational amplifier directly connected to a resistor and a capacitor; and
    wherein a second feedback loop is formed between the operational amplifier and the capacitor.

2. The circuit assembly as claimed in claim 1, in which a power converter comprises a step-up converter, a buck converter, flyback converter, SEPIC converter, Cuk converter, LLC, LCC, or DARC converter.

3. The circuit assembly as claimed in claim 1, wherein the switching regulator:
    has a switching transistor, an inductor, and a current valve, wherein
    the current valve is actively controlled, and
    the switching regulator is operated in a forced continuous mode.

4. The circuit assembly as claimed in claim 1, wherein the load consists of LEDs.

5. The circuit assembly as claimed in claim 1, wherein the loop gain at 10 Hz is 55 dB and the loop gain at 100 Hz is 35 dB.

6. The circuit assembly as claimed in claim 1, wherein a two-point regulation scheme is provided, which has a lower threshold and an upper threshold.

7. The circuit assembly as claimed in claim 6, wherein the lower threshold, which describes the switch-off time of the current valve in the forced continuous mode, is defined for a negative choke current.

8. The circuit assembly as claimed in claim 7, wherein the lower threshold is lower for a lower output voltage than for a higher output voltage.

9. The circuit assembly as claimed in claim 7, wherein for a lower output voltage, an additional delay time dependent on the output voltage is inserted after reaching the lower threshold, to delay the switch-off time of the current valve.

10. The circuit assembly as claimed in claim 6, wherein the upper threshold, which describes the switch-off time of the switching transistor, is defined by the output current of the circuit assembly to be controlled and the switch-off time of the current valve.

* * * * *